United States Patent
Liu et al.

(10) Patent No.: US 10,649,483 B2
(45) Date of Patent: May 12, 2020

(54) ELECTRIC PEDAL FOR AUTOMOBILES

(71) Applicant: Anhui Aggeus Auto-tech Co., Ltd., Wuhu, Anhui (CN)

(72) Inventors: Quanfu Liu, Wuhu (CN); Fujing Lai, Wuhu (CN); Kai Hu, Wuhu (CN); Han Xu, Wuhu (CN)

(73) Assignee: Anhul Aggeus Auto-tech Co., Ltd., Wuhu, Anhui (CN)

( * ) Notice: Subject to any disclaimer, the term of this patent is extended or adjusted under 35 U.S.C. 154(b) by 0 days.

(21) Appl. No.: 16/433,581

(22) Filed: Jun. 6, 2019

(65) Prior Publication Data

US 2019/0294196 A1 Sep. 26, 2019

Related U.S. Application Data

(63) Continuation of application No. PCT/CN2017/114593, filed on Dec. 5, 2017.

(30) Foreign Application Priority Data

Dec. 9, 2016 (CN) .......................... 2016 1 1128249

(51) Int. Cl.
*B60R 3/00* (2006.01)
*G05G 1/40* (2008.04)
(Continued)

(52) U.S. Cl.
CPC ................. *G05G 1/40* (2013.01); *B60R 3/02* (2013.01); *F16H 21/44* (2013.01)

(58) Field of Classification Search
CPC .. B60R 3/02; B60R 3/002; B60R 3/00; G05G 1/40; G05G 1/30; F16H 21/44
See application file for complete search history.

(56) References Cited

U.S. PATENT DOCUMENTS 4,110,673 A * 8/1978 Magy ........................ B60R 3/02
105/444
6,955,370 B2 * 10/2005 Fabiano .................. B60R 3/002
280/163

(Continued)

FOREIGN PATENT DOCUMENTS

CN 104385989 A 3/2015
CN 204236347 U 4/2015

(Continued)

OTHER PUBLICATIONS

International Search Report from PCT Application No. PCT/CN2017/114593, dated Feb. 28, 2018.

*Primary Examiner* — James M Dolak
(74) *Attorney, Agent, or Firm* — Budzyn IP Law, LLC (57) ABSTRACT

Provided is a retractable pedal for an automobile. The pedal comprises a driving support (2), a drive mechanism (4) and a footrest (5), wherein both the driving support (2) and the drive mechanism (4) are installed on the same side of the bottom of an automobile body; the driving support (2) comprises a first transmission mechanism and a first connecting rod (2*d*), and the front end of the first connecting rod (2*d*) is fixedly connected to the footrest (5); the first transmission mechanism drives the first connecting rod (2*d*) to expand and retract; the pedal further comprises at least one driven support (3) which synchronously moves with the driving support (2). According to this pedal, a traditional gear transmission mechanism is omitted so as to reduce manufacturing costs and reduce the generation of abnormal sounds, and the footrest can be ensured to retract in place.

12 Claims, 4 Drawing Sheets

(51) Int. Cl.
*F16H 21/44* (2006.01)
*B60R 3/02* (2006.01)

(56) References Cited

U.S. PATENT DOCUMENTS

| | | | | |
|---|---|---|---|---|
| 7,017,927 | B2 * | 3/2006 | Henderson | B60R 3/002 |
| | | | | 280/163 |
| 7,118,120 | B2 * | 10/2006 | Lee | B60R 3/002 |
| | | | | 280/166 |
| 7,163,221 | B2 * | 1/2007 | Leitner | B60R 3/02 |
| | | | | 105/444 |
| 7,367,574 | B2 * | 5/2008 | Leitner | B60R 3/02 |
| | | | | 280/163 |
| 7,377,531 | B2 * | 5/2008 | Fabiano | B60R 3/002 |
| | | | | 182/88 |
| 8,052,162 | B2 * | 11/2011 | Yang | B60R 3/02 |
| | | | | 280/163 |
| 9,522,634 | B1 * | 12/2016 | Smith | B60R 3/02 |
| 10,195,997 | B2 * | 2/2019 | Smith | B60R 3/02 |
| 10,343,610 | B2 * | 7/2019 | Long | B60R 3/002 |
| 2005/0035568 | A1 | 2/2005 | Lee et al. | |
| 2010/0320714 | A1 * | 12/2010 | Webb | B60R 3/02 |
| | | | | 280/166 |

FOREIGN PATENT DOCUMENTS

| | | |
|---|---|---|
| CN | 204659599 U | 9/2015 |
| CN | 205632299 U | 10/2016 |
| CN | 106627383 A | 5/2017 |
| CN | 206141447 U | 5/2017 |
| CN | 206358076 U | 7/2017 |
| CN | 206485276 U | 9/2017 |

* cited by examiner

ELECTRIC PEDAL FOR AUTOMOBILES

CROSS-REFERENCE

This application is a continuation of PCT Application No. PCT/CN2017/114593, filed Dec. 5, 2017, which claims priority to Chinese Patent Application No. 2016111282496, filed on Dec. 9, 2016 and entitled ELECTRONIC PEDAL FOR AUTOMOBILES, the contents of which are incorporated herein by reference in its entirety.

TECHNICAL FIELD

The present invention belongs to the technical field of pedals for automobiles, and particularly relates to a retractable pedal for automobiles.

BACKGROUND OF THE PRESENT INVENTION

The related technical background of the present invention will be described below, but these descriptions do not necessarily constitute the prior art to the present invention.

Pedals for vehicles include fixed pedals and retractable pedals. As its name implies, a fixed pedal cannot retract and is always stretched on a sidewall of a vehicle body in the mounted state. In contrast, due to the arrangement of a retractable support structure, a retractable pedal can retract when not in use and stretch when in use. When the pedal retracts, the pedal is in the underneath of a side of a vehicle body, instead of protruding out of the outer side of the vehicle body. Accordingly, the pedal will not collide with obstacles when the vehicle passes through a narrow road. Therefore, the damage to the pedal is avoided.

However, due to the unreasonable design of the retractable support structure, the retractable pedal in the prior art has various disadvantages and deficiencies.

1. When the pedal is in the retracted state, the driven support structure will fall down or become loose since it is not tight enough.

2. The output end of the motor and the driving shaft are in complicated gear transmission. Consequently, a high manufacture precision is required and it is difficult to ensure such a high manufacture precision. The cost for manufacturing such a gear transmission mechanism is high. Furthermore, abnormal sound is likely to occur in gear transmission.

3. The driving shaft and the driving arm may slide relatively due to infirm connection therebetween (in most cases, the driving shaft may rotate relative to the driving arm), resulting in abnormal sound and noise.

4. Since the transmission shaft is in close fit with its connector, the transmission shaft and the connector may slide relatively after long-term operation. As a result, the service life of the product may be influenced and abnormal sound may occur.

5. Since a copper-plated iron bushing is used between the transmission shaft and the corresponding shaft hole, the lubrication effect maybe deteriorated after long-term wear, and abnormal sound may occur along with the continuous deterioration of the lubrication effect.

6. After the product is well-mounted, the pedal will block the vehicle lifting part. As a result, the pedal has to be removed in the event of vehicle failures. It is inconvenient for maintenance.

SUMMARY OF THE PRESENT INVENTION

In order to solve the disadvantages and deficiencies of the retractable pedal in the prior art, the present invention provides an electric pedal for automobiles. A driving shaft of a driving mechanism of the electric pedal is directly connected to a first transmission mechanism of a driving support, so the conventional gear transmission mechanism is omitted, the manufacture cost is reduced, and the possibility of occurrence of abnormal sound is reduced. When the pedal is in the retracted state, its upper surface is substantially parallel to the ground, without any horizontally outward component force. This ensures that the pedal can retract in place.

In a preferred embodiment of the present invention, an electric pedal for automobiles is provided, including a driving support, a driving mechanism and a pedal, the driving support and the driving mechanism being mounted on a same side of the bottom of a vehicle body, characterized in that the driving support includes a first transmission mechanism and a first connecting rod, with a front end of the first connecting rod being fixedly connected to the pedal; and the first transmission mechanism drives the first connecting rod to stretch and retract;

a driving shaft of the driving mechanism is fixedly connected to the first transmission mechanism directly and drives the first transmission mechanism to unfold and fold so as to allow the first connecting rod to stretch and retract; and when the first connecting rod transitions from a retracted state to a stretched state, the pedal is driven to move to the underneath of an outer side of the vehicle body, wherein, when the pedal is in a retracted state and a stretched state, its upper surface is substantially parallel to the ground.

Further, the driving mechanism includes a driving motor mounted on the bottom of the vehicle body, a gearbox is mounted at an output end of the driving motor, and a driving shaft of the gearbox is connected to the first transmission mechanism.

Further, the first transmission mechanism includes a first connecting pedestal, a first driving arm and a first support arm; the driving shaft runs through the first connecting pedestal to be fixedly connected to one end of the first driving arm; the other end of the first driving arm is rotatably connected to the first connecting rod; and, two ends of the first support arm are rotatably connected to the first connecting pedestal and the first connecting rod, respectively.

Further, a first connecting lug and a second connecting lug arranged in parallel are provided on the first connecting rod, with first shaft holes on a same axis and second shaft holes on a same axis being formed on the first connecting lug and the second connecting lug, respectively, and the axis of the first shaft holes being parallel to the axis of the second shaft holes; a first connecting plate and a second connecting plate arranged in parallel are provided on the first connecting pedestal, with third shaft holes on a same axis and fourth shaft holes on a same axis being formed on the first connecting plate and the second connecting plate, respectively, and the axis of the third shaft holes being parallel to the axis of the fourth shaft holes; a first transmission shaft is fixed at one end of the first support arm and a second transmission shaft is fixed at the other end thereof, with two ends of the first transmission shaft on the first support arm being fitted with the two first shaft holes on the first connecting rods, and two ends of the second transmission shaft on the first support arm being fitted with the two third shaft holes on the first connecting pedestal; a third transmission shaft being fixed at one end of the first driving arm, with two ends of the third transmission shaft on the first driving arm being fitted with the two second shaft holes on the first connecting rod; and, the driving shaft is fixedly connected to the other end of the first driving arm, and the driving shaft is fitted with the two fourth shaft holes on the first connecting pedestal.

Further, fifth shaft holes for mounting the first transmission shaft or the second transmission shaft are formed at two ends of the first support arm; and, a sixth shaft hole for mounting the third transmission shaft is formed at one end of the first driving arm and a seventh shaft hole for mounting the driving shaft is formed at the other end thereof.

Further, transmission shaft locking devices are provided at two ends of the first support arm; and, a transmission shaft locking device is provided at one end of the first driving arm and a driving shaft locking device is provided at the other end thereof.

Further, the transmission shaft locking devices include first locking bolts, first threaded holes fitted with the first locking bolts are formed in middle sections of all the first transmission shaft, the second transmission shaft and the third transmission shaft, and first through holes for allowing the first locking bolts to pass therethrough are formed at two ends of the first support arm and at one end of the first driving arm.

Further, the driving shaft locking device includes a second locking bolt and a wedge-shaped fixation block; a flat groove is formed in a middle section of the driving shaft; a conical hole and a second through hole which are perpendicular to the seventh shaft hole and located on a same axis are formed at an end of the first driving arm connected to the driving shaft; the wedge-shaped fixation block is inserted into the conical hole from one side of the first driving arm; a slope fitted with the flat groove on the driving shaft is provided on a sidewall of the wedge-shaped fixation block; a second threaded hole coaxial to the wedge-shaped fixation block is formed on the wedge-shaped fixation block; and, the second locking bolt is inserted into the second through hole from the other side of the first driving arm and in thread fit with the second threaded hole.

Further, bushings are provided within all the first shaft holes, the second shaft holes, the third shaft holes and the fourth shaft holes.

Further, sunk grooves are formed on a side of the first support arm and a side of a second support arm both facing the first driving arm and a second driving arm, and cushions are mounted within the sunk grooves.

Further, ribs are provided on bottoms of a side of the first connecting rod and a side of a second connecting rod both close to the pedal.

Further, a T-shaped groove is formed on the pedal; a connecting block having a T-shaped section is mounted within the T-shaped groove; grooves fitted with the connecting block are formed at front ends of the first connecting rod and the second connecting rod; and a third threaded hole for locking the pedal is formed on the connecting block.

Further, when the pedal is in a retracted position and a stretched position, its upper surface is flush with the ground.

Further, when the pedal is in a retracted position and a stretched position, its upper surface forms an acute angle relative to the ground.

Further, the upper surface of the pedal is inclined inward at an angle of 0 to 5 degrees.

In another preferred embodiment of the present invention, an electric pedal for automobiles is provided, including a driving support, a driving mechanism and a pedal, the driving support and the driving mechanism being mounted on a same side of the bottom of a vehicle body, characterized in that the driving support includes a first transmission mechanism and a first connecting rod, with a front end of the first connecting rod being fixedly connected to the pedal; the first transmission mechanism drives the first connecting rod to stretch and retract;

a driving shaft of the driving mechanism is fixedly connected to the first transmission mechanism directly and drives the first transmission mechanism to unfold and fold so as to allow the first connecting rod to stretch and retract;

when the first connecting rod transitions from a retracted state to a stretched state, the pedal is driven to move to the underneath of an outer side of the vehicle body, wherein, when the pedal is in a retracted state and a stretched state, its upper surface is substantially parallel to the ground;

the electric pedal further includes at least one driven support; the driven support includes a second transmission mechanism and a second connecting rod, with a front end of the second connecting rod being fixedly connected to the pedal; and, the driving support drives the second transmission mechanism to synchronously unfold and fold by the pedal so that the second connecting rod synchronously stretches and retracts.

Further, the driving mechanism includes a driving motor mounted on the bottom of the vehicle body, a gearbox is mounted at an output end of the driving motor, and a driving shaft of the gearbox is connected to the first transmission mechanism.

Further, the first transmission mechanism includes a first connecting pedestal, a first driving arm and a first support arm; the driving shaft runs through the first connecting pedestal to be fixedly connected to one end of the first driving arm; the other end of the first driving arm is rotatably connected to the first connecting rod; two ends of the first support arm are rotatably connected to the first connecting pedestal and the first connecting rod, respectively; the second transmission mechanism includes a second connecting pedestal, a second driving arm and a second support arm; two ends of the second driving arm are rotatably connected to the second connecting pedestal and the second connecting rod, respectively; and, two ends of the second support arm are rotatably connected to the second connecting pedestal and the second connecting rod, respectively.

Further, a first connecting lug and a second connecting lug arranged in parallel are provided on each of the first connecting rod and the second connecting rod, with first shaft holes on a same axis and second shaft holes on a same axis being formed on the first connecting lug and the second connecting lug, respectively, and the axis of the first shaft holes being parallel to the axis of the second shaft holes; a first connecting plate and a second connecting plate arranged in parallel are provided on each of the first connecting pedestal and the second connecting pedestal, with third shaft holes on a same axis and fourth shaft holes on a same axis being formed on the first connecting plate and the second connecting plate, respectively, and the axis of the third shaft holes being parallel to the axis of the fourth shaft holes; a first transmission shaft is fixed at one end of each of the first support arm and the second support arm and a second transmission shaft is fixed at the other end thereof, with two ends of the first transmission shaft on the first support arm being fitted with the two first shaft holes on the first connecting rods, two ends of the second transmission shaft on the first support arm being fitted with the two third shaft holes on the first connecting pedestal, two ends of the first transmission shaft on the second support arm being fitted with the two first shaft holes on the second connecting rod, and two ends of the second transmission shaft on the second support arm being fitted with the two third shaft holes on the second connecting pedestal; a third transmission shaft is fixed at one end of each of the first driving arm and the second driving arm, with two ends of the third transmission shaft on the first driving arm being fitted with the two second shaft holes on the first connecting rod, and two ends of the third transmission shaft on the second driving arm being fitted with the two second shaft holes on the second connecting rod; the driving shaft is fixedly connected to the other end of the first driving arm, and the driving shaft is fitted with the two fourth shaft holes on the first connecting pedestal; and, a fourth transmission shaft is fixed at the other end of the second driving arm, and two ends of the fourth transmission shaft are fitted with the two fourth shaft holes on the second connecting pedestal.

Further, fifth shaft holes for mounting the first transmission shaft or the second transmission shaft are formed at two ends of each of the first support arm and the second support arm; a sixth shaft hole for mounting the third transmission shaft is formed at one end of each of the first driving arm and the second driving arm; a seventh shaft hole for mounting the driving shaft is formed at the other end of the first driving arm; and an eighth shaft hole for mounting the fourth transmission shaft is formed at the other end of the second driving arm.

Further, transmission shaft locking devices are provided at two ends of each of the first support arm, the second support arm and the second driving arm; and, a transmission shaft locking device is provided at one end of the first driving arm and a driving shaft locking device is provided at the other end thereof.

Further, the transmission shaft locking devices include first locking bolts, first threaded holes fitted with the first locking bolts are formed in middle sections of all the first transmission shaft, the second transmission shaft, the third transmission shaft and the fourth transmission shaft; and first through holes for allowing the first locking bolts to pass therethrough are formed at two ends of the first support arm, at two ends of the second support arm, at two ends of the second driving arm and at one end of the first driving arm.

Further, the driving shaft locking device includes a second locking bolt and a wedge-shaped fixation block; a flat groove is formed in a middle section of the driving shaft; a conical hole and a second through hole which are perpendicular to the seventh shaft hole and located on a same axis are formed at an end of the first driving arm connected to the driving shaft; the wedge-shaped fixation block is inserted into the conical hole from one side of the first driving arm; a slope fitted with the flat groove on the driving shaft is provided on a sidewall of the wedge-shaped fixation block; a second threaded hole coaxial to the wedge-shaped fixation block is formed on the wedge-shaped fixation block; and, the second locking bolt is inserted into the second through hole from the other side of the first driving arm and in thread fit with the second threaded hole.

Further, bushings are provided within all the first shaft holes, the second shaft holes, the third shaft holes and the fourth shaft holes.

Further, sunk grooves are formed on a side of the first support arm and a side of a second support arm both facing the first driving arm and a second driving arm; and cushions are mounted within the sunk grooves.

Further, ribs are provided on bottoms of a side of the first connecting rod and a side of a second connecting rod both close to the pedal.

Further, a T-shaped groove is formed on the pedal, a connecting block having a T-shaped section is mounted within the T-shaped groove; grooves fitted with the connecting block are formed at front ends of the first connecting rod and the second connecting rod; and a third threaded hole for locking the pedal is formed on the connecting block.

Further, when the pedal is in a retracted position and a stretched position, its upper surface is flush with the ground.

Further, when the pedal is in a retracted position and a stretched position, its upper surface forms an acute angle relative to the ground.

Further, the upper surface of the pedal is inclined inward at an angle of 0 to 5 degrees.

The present invention specifically has the following advantages.

1. The arrangement of a special support structure ensures that the pedal is horizontal or approximately horizontal when in the retracted state and the stretched state, and that the pedal can retract in place. In this way, the pedal is prevented from stretching during the running of a vehicle, which otherwise may influence the passage of the vehicle body through a road and get into danger.

2. The output shaft of the driving mechanism is used as a driving shaft in place of a conventional gear transmission mechanism; the driving mechanism is equipped with a gearbox and has a good self-locking function.

3. The driving shaft is locked with the first driving arm by the second locking bolt, so that the slope on the wedge-shaped fixation block compresses the flat groove on the driving shaft; and the firm connection between the driving shaft and the first driving arm is ensured.

4. All the transmission shafts are fixed to the corresponding support arms or driving arms by the first locking bolt to form a whole. Therefore, it is firmer than the simple close fitting of the transmission shafts within the shaft holes on the corresponding support arms or driving arms.

5. Bushings made of special material are provided between all the transmission shafts and the shaft holes and between the driving shaft and the shaft holes. The bushings have a good self-lubrication effect, so abnormal sound resulted from poor lubrication effect after long-term operation is avoided.

6. Rib structures are provided on the bottom of the first connecting rod and the bottom of the second connecting rod, so that the normal maintenance of a vehicle equipped with the retractable pedal for automobiles of the present invention will not be influenced because the first connecting rod and the second connecting rod serve as the original vehicle lifting part on the bottom of the vehicle body.

7. The first connecting rod and the second connecting rod are fixed to the pedal by a connecting block, a T-shaped groove for mounting the connecting block is formed on the pedal, and grooves fitted with the corresponding connecting block are formed at front ends of the first connecting rod and the second connecting rod. With such an arrangement, the stress between the pedal and the first connecting rod and between the pedal and the second connecting rod is transferred to the outer wall of the connecting block, not completely borne by the bolts; and, after the connecting block is used to assist in connection, it can be detected whether the driving support and the driven support are mounted in correct positions.

BRIEF DESCRIPTION OF THE DRAWINGS

The features and advantages of the present invention will become more apparent from the following detailed description of embodiments taken with reference to the accompanying drawings, in which:

FIG. 9 is a schematic diagram of the movement of the driving support from the retracted position to the stretched position according to the present invention, in which:

1: vehicle body; 2: driving support; 2a: first connecting pedestal; 2b: first driving arm; 2c: first support arm; 2d: first connecting rod; 3: driven support; 3a: second connecting pedestal; 3b: second driving arm; 3c: second support arm; 3d: second connecting rod; 4: driving mechanism; 4a: driving motor; 4b: gearbox; 4c: driving shaft; 4c1: flat groove; 5: pedal; 5a: T-shaped groove; 6: first connecting lug; 7: second connecting lug; 8: first connecting plate; 9: second connecting plate; 10: first shaft hole; 11: second shaft hole; 12: third shaft hole; 13: fourth shaft hole; 14: fourth shaft hole; 15: sixth shaft hole; 16: seventh shaft hole; 17: eighth shaft hole; 18: first transmission shaft; 19: second transmission shaft; 20: third transmission shaft; 21: fourth transmission shaft; 22: first locking bolt; 23: second locking bolt; 24: first threaded hole; 25: second threaded hole; 26: third threaded hole; 27: first through hole; 28: second through hole; 29: wedge-shaped fixation block; 30: bushing 31: cushion; 32: rib; 33: connecting block; and, 34: vehicle lifting plate.

DETAILED DESCRIPTION OF THE PRESENT INVENTION

The exemplary implementations of the present invention will be described below in detail with reference to the accompanying drawings. The description of the exemplary implementations is merely illustrative, rather than limiting the present invention and applications or usages thereof.

In an embodiment of the present invention, a retractable pedal for automobiles is provided. The retractable pedal has a special support structure design, wherein a driving support 2 is directly connected to a driving shaft 4c of a driving mechanism 4. That is, the output shaft of the motor serves as the driving shaft 4c, and the gear transmission mechanism is omitted. This overcomes the defect that it is likely to generate abnormal sound in the conventional design where a pedal 5 is driven to stretch and retract by a gear transmission mechanism. Since the complicated gear transmission mechanism is omitted, the manufacture cost for the whole pedal for automobiles is reduced greatly. Since a driving motor 4a of the driving mechanism 4 is equipped with a gearbox 4b and has a good self-locking function. This design, together with a special support structure, ensures that the pedal 5 is always horizontal or approximately horizontal during the stretching and retraction process. Particularly in a retracted position, when the pedal 5 is horizontal, a force applied to the support structure by the weight of the pedal 5 will not generate a horizontally outward component force. That is, there is no situation where the conventional retractable pedal 5 cannot retract tightly due to the horizontally outward component force. Accordingly, the pedal 5 is prevented from stretching during the running of a vehicle due to the non-tight retraction of the pedal to influence the passage of a vehicle body through a road and get into danger.

The fixed connection between the driving shaft 4c and a first driving arm 2b is firm. Specifically, by fitting a driving shaft locking device with a flat groove 4c1 formed on the driving shaft 4c and locking by a second locking bolt 23, a slope on a wedge-shaped fixation block 29 compresses the flat groove 4c1 on the driving shaft 4c, so that the firmness of the connection between the driving shaft 4c and the first driving arm 2b is ensured, and the relative sliding between the driving shaft 4c and the first driving arm 2b due to the loose connection after the long-term operation is avoided effectively. All transmission shafts are fixed to the corresponding support arms or driving arms by first locking bolts 22 to form a whole, so it is firmer than the simple close fitting of the transmission shafts within the shaft holes on the corresponding support arms or driving arms. Bushings 30 made of special material are provided between all the transmission shafts and the shaft holes and between the driving shaft 4c and the shaft holes, and the bushings 30 have a good self-lubrication effect, so abnormal sound resulted from poor lubrication effect after long-term use is avoided. A first connecting rod 2d is connected to the pedal 5 by a connecting block 33, so the stress between the pedal 5 and the first connecting rod 2d is transferred to an outer wall of the connecting block 33, not completely borne by the bolts. A rib 32 structure is provided on the bottom of the first connecting rod 2d, so that the normal maintenance of a vehicle equipped with the retractable pedal for automobiles of the present invention will not be influenced because the first connecting rod 2d serves as the original vehicle lifting part on the bottom of the vehicle body 1.

With reference to FIGS. 1, 2, 3 and 4, the electric pedal 5 for automobiles includes a driving support 2, a driving mechanism 4 and a pedal 5, the driving support 2 and the driving mechanism 4 being mounted on a same side of the bottom of a vehicle body 1, characterized in that the driving support 2 includes a first transmission mechanism and a first connecting rod 2d, with a front end of the first connecting rod 2d being fixedly connected to the pedal 5; and the first transmission mechanism drives the first connecting rod 2d to stretch and retract.

A driving shaft 4c of the driving mechanism 4 is fixedly connected to the first transmission mechanism directly and drives the first transmission mechanism to unfold and fold so as to allow the first connecting rod 2d to stretch and retract.

When the first connecting rod 2d transitions from a retracted state to a stretched state, the pedal 5 is driven to move to the underneath of an outer side of the vehicle body 1, wherein, when the pedal 5 is in a retracted state and a stretched state, its upper surface is substantially parallel to the ground.

In the present invention, by a special support structure design, the driving support 2 is connected to the driving mechanism 4, and the driving mechanism 4 drives the driving support 2 to stretch and retract. In the state shown in FIG. 1, a first driving arm 2b is fitted with a first support arm 2c. In this case, the petal 5 at the front end of the first connecting rod 2d is horizontal or forms a very small included angle relative to the horizontal direction, and the first connecting rod 2d is stressed by its weight and a vertically downward force applied by the pedal 5, where the stressed forces are in a vertical direction. After the driving support 2 retracts in place, due to the self-locking force of a gearbox 4, there is no outward pull force or there is a too small pull force to resist against the self-locking force of the gearbox 4b, so there is no risk for the driving support 2 to stretch fully or stretch to a certain extent. The fit clearance between the pedal 5 and the vehicle body 1 is substantially consistent.

Figure 5:
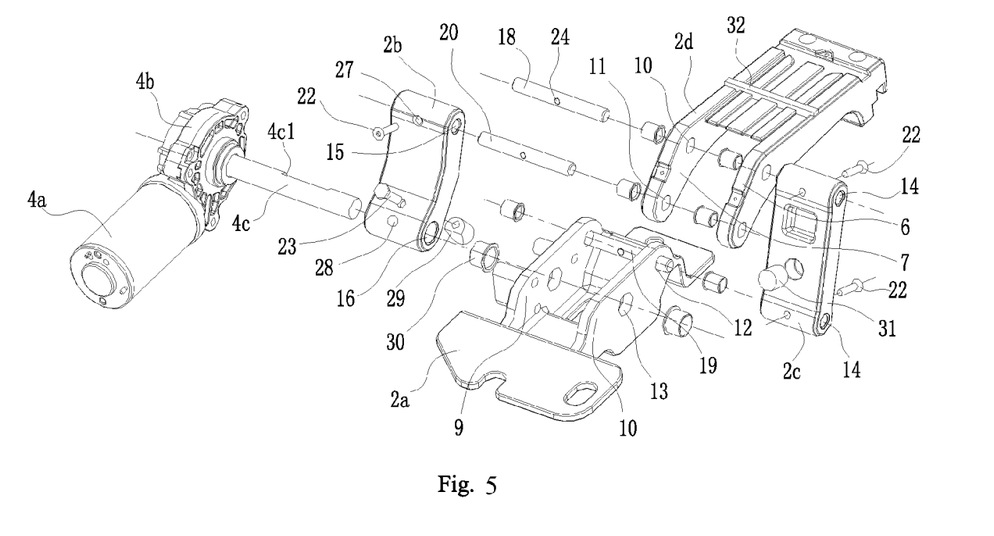
FIG. 5 is a stereoscopic breakdown structure diagram of the driving support according to the present invention.
Figure 6:
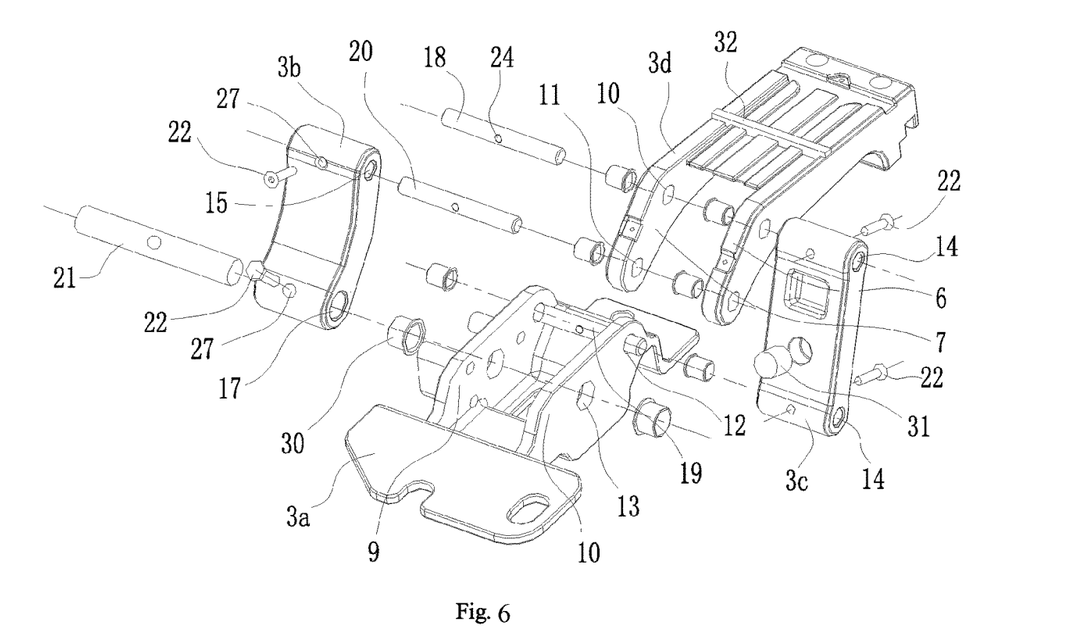
FIG. 6 is a stereoscopic breakdown structure diagram of a driven support according to the present invention.

With reference to FIGS. 5 and 6, the driving mechanism 4 includes a driving motor 4a mounted on the bottom of the vehicle body 1, a gearbox 4b is mounted at an output end of the driving motor 4a, and a driving shaft 4c of the gearbox 4b is connected to the first transmission mechanism.

By directly connecting the driving shaft 4c of the gearbox 4b to the first transmission mechanism, the complicated gear transmission mechanism is omitted and the manufacture cost is reduced.

The first transmission mechanism includes a first connecting pedestal 2a, a first driving arm 2b and a first support arm 2c. The driving shaft 4c runs through the first connecting pedestal to be fixedly connected to one end of the first driving arm 2b. The other end of the first driving arm 2b is rotatably connected to the first connecting rod 2d. Two ends of the first support arm 2c are rotatably connected to the first connecting pedestal 2a and the first connecting rod 2d, respectively.

A first connecting lug 6 and a second connecting lug 7 arranged in parallel are provided on the first connecting rod 2d. First shaft holes 10 on a same axis and second shaft holes 11 on a same axis are formed on the first connecting lug 6 and the second connecting lug 7, respectively, and the axis of the first shaft holes 10 is parallel to the axis of the second shaft holes 11. A first connecting plate 8 and a second connecting plate 9 arranged in parallel are provided on the first connecting pedestal 2a. Third shaft holes 12 on a same axis and fourth shaft holes 13 on a same axis are formed on the first connecting plate 8 and the second connecting plate 9, respectively, and the axis of the third shaft holes 12 is parallel to the axis of the fourth shaft holes 13. A first transmission shaft 18 is fixed at one end of the first support arm 2c and a second transmission shaft 19 is fixed at the other end thereof. Two ends of the first transmission shaft 18 on the first support arm 2c are fitted with the two first shaft holes 10 on the first connecting rods 2d, and two ends of the second transmission shaft 19 on the first support arm 2c are fitted with the two third shaft holes 12 on the first connecting pedestal. A third transmission shaft 20 is fixed at one end of the first driving arm 2b. Two ends of the third transmission shaft 20 on the first driving arm 2b are fitted with the two second shaft holes 11 on the first connecting rod 2d. The driving shaft 4c is fixedly connected to the other end of the first driving arm 2b, and the driving shaft 4c is fitted with the two fourth shaft holes 13 on the first connecting pedestal 2a.

The first connecting pedestal 2a, the first connecting rod 2d, the first driving arm 2b and the first support arm 2c form a stable four-rod mechanism. The stable stretching and retraction of the first connecting rod 2d can be realized under the drive of the driving mechanism 4. In this way, the attitude of the pedal 5 in the retracted state and the stretched state is ensured. That is, this ensures that the upper surface of the pedal 5 is substantially parallel to the ground, and thus ensures that the force applied to the first connecting rod 2d by the pedal 5 in the retracted or stretched state is vertically downward or substantially vertically downward. Particularly, this prevents the generation of a horizontally outward component force which may cause the driving support 2 not to retract in place in the retracted state.

Fifth shaft holes 14 for mounting the first transmission shaft 18 or the second transmission shaft 19 are formed at two ends of the first support arm 2c; and, a sixth shaft hole 15 for mounting the third transmission shaft 20 is formed at one end of the first driving arm 2b and a seventh shaft hole 16 for mounting the driving shaft 4c is formed at the other end thereof.

For ease of mounting, in the present invention, the transmission shafts on the first driving arm 2b and the first support arm 2c are mounted detachably, so it is convenient to mount the retractable pedal for automobiles of the present invention on the bottom of a different vehicle body 1 and adjust its position.

Transmission shaft locking devices are provided at two ends of the first support arm 2c; and, a transmission shaft locking device is provided at one end of the first driving arm 2b and a driving shaft locking device is provided at the other end thereof.

It is to be noted that, since the driving shaft 4c and the transmission shafts are connected to the corresponding driving arms or support arms in a detachable manner, the mounting firmness of the driving shaft 4c and the transmission shafts will directly affect the stability of the actions of the driving support 2, and infirm mounting will cause abnormal sound. Therefore, in the present invention, transmission shaft locking devices are provided for all the transmission shafts, and a driving shaft 4c locking device is provided for the driving shaft 4c.

The transmission shaft locking devices include first locking bolts 22, first threaded holes 24 fitted with the first locking bolts 22 are formed in middle sections of all the first transmission shaft 18, the second transmission shaft 19 and the third transmission shaft 20, and first through holes 27 for allowing the first locking bolts 22 to pass therethrough are formed at two ends of the first support arm 2c and at one end of the first driving arm 2b.

The first locking bolts 22 may connect the corresponding transmission shafts to the corresponding driving arms or support arms to form a whole, so the relative sliding, particularly relative rotation, between the transmission shafts and the driving arms or support arms is avoided.

Figure 7:
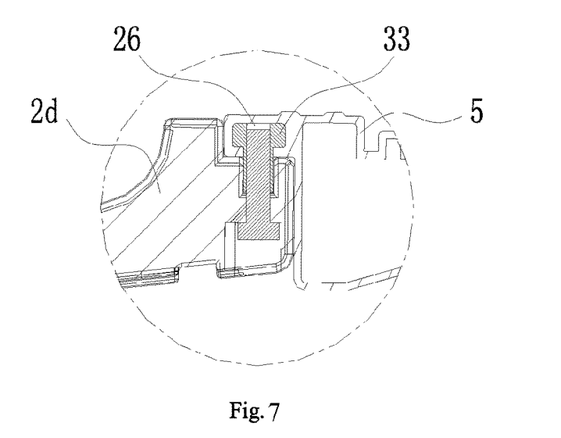
FIG. 7 is an enlarged view of part A of FIG. 3.

The driving shaft locking device includes a second locking bolt 23 and a wedge-shaped fixation block 29. A flat groove 4c1 is formed in a middle section of the driving shaft 4c. A conical hole and a second through hole 28 which are perpendicular to the seventh shaft hole 16 and located on a same axis are formed at an end of the first driving arm 2b connected to the driving shaft 4c. The wedge-shaped fixation block 29 is inserted into the conical hole from one side of the first driving arm 2b. A slope fitted with the flat groove 4c1 on the driving shaft 4c is provided on a sidewall of the wedge-shaped fixation block. A second threaded hole 25 coaxial to the wedge-shaped fixation block is formed on the wedge-shaped fixation block 29. The second locking bolt 23 is inserted into the second through hole 28 from the other side of the first driving arm 2b and in thread fit with the second threaded hole 25.

Since the torque borne by the driving shaft 4c after being fixedly connected to the first driving arm 2b is much greater than that borne by other transmission shafts, the driving shaft 4c locking device has a firmer locking function than the transmission shaft locking devices. The wedge-shaped fixation block 29 and the second locking bolt 23 are mounted on two sides of the first driving arm 2b, respectively, so the slope on the wedge-shaped fixation block 29 can compress the flat groove 4c1 on the driving shaft 4c more tightly by locking the second locking bolt 23, and the fixation of the driving shaft 4c and the first driving arm 2b becomes firmer.

Bushings 30 are provided within all the first shaft holes 10, the second shaft holes 11, the third shaft holes 12 and the fourth shaft holes 13.

When the driving shaft 4c and the transmission shafts are fitted with the corresponding shaft holes, a lubricating medium is generally needed for the lubrication between the shafts and the holes. Since the wall of holes and the shafts are made of metal, in the case of no continuous supply of the lubrication medium, the shafts and the shaft holes will be worn out due to long-term friction and will generate abnormal sound. It is inevitable to carry out special wear-resistant treatment to improve the wear resistance of the shafts and the shaft holes. In doing so, the manufacture process will become more complicated, and the manufacture cost will also be increased relatively. Therefore, in the present invention, bushings 30 made of special material with a self-lubricating function are mounted within all the shaft holes. Since the bushings 30 are relatively small in size, the bushings 30 may be made of different material from other components, so that it is easy to manufacture the bushings and the cost is greatly reduced.

Sunk grooves are formed on a side of the first support arm 2c and a side of the second support arm 3c both facing the first driving arm 2b and the second driving arm 3b, and cushions 31 are mounted within the sunk grooves.

It is to be noted that, when the pedal 5 stays in the retraced position or the stretched position, the driving support 2 should have good stability; and, when the pedal 5 reaches the retraced position or the stretched position, the collision and shock between components should be reduced as far as possible. The cushions 31 are mounted on an inner side of the first support art 2c, specifically on a side facing the first driving arm 2b. When the pedal 5 is in a completely stretched position, the first driving arm 2b compresses the cushions 31. In this case, the first driving arm 2b, the cushions 31 and the first support arm 2c are closely fitted with each other, so that the driving support 2 is in an unfolded state. The cushions 31 ensure the close fitting of the first driving arm 2b with the first support arm 2c and also reduce the collision between the first support arm 2c and the first driving arm 2b. When the pedal 5 retracts, the cushions 31 on the first support arm 2c is also compressed by the first driving arm 2b, and the cushions 31, the first support arm 2c and the first driving arm 2b are closely fitted with each other, so that the driving support 2 is in another state.

Ribs 32 are provided on bottoms of a side of the first connecting rod 2d and a side of the second connecting rod 3d both close to the pedal 5.

Figure 8:
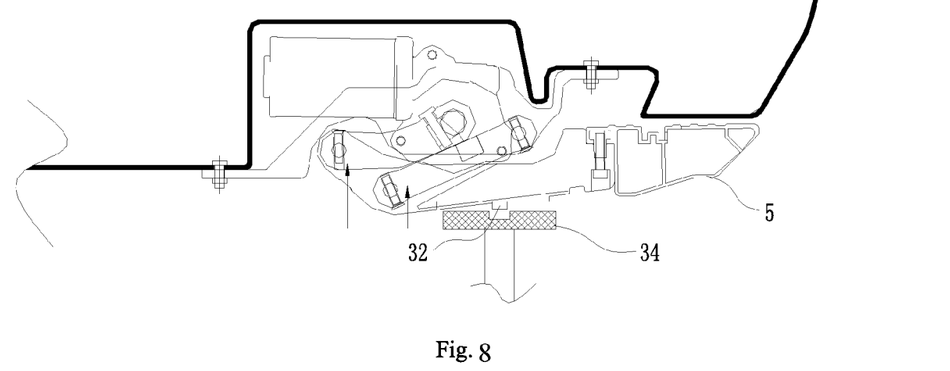
FIG. 8 is a schematic diagram of a state where the pedal of the present invention is used with a jack or a lifter.
Figure 9:
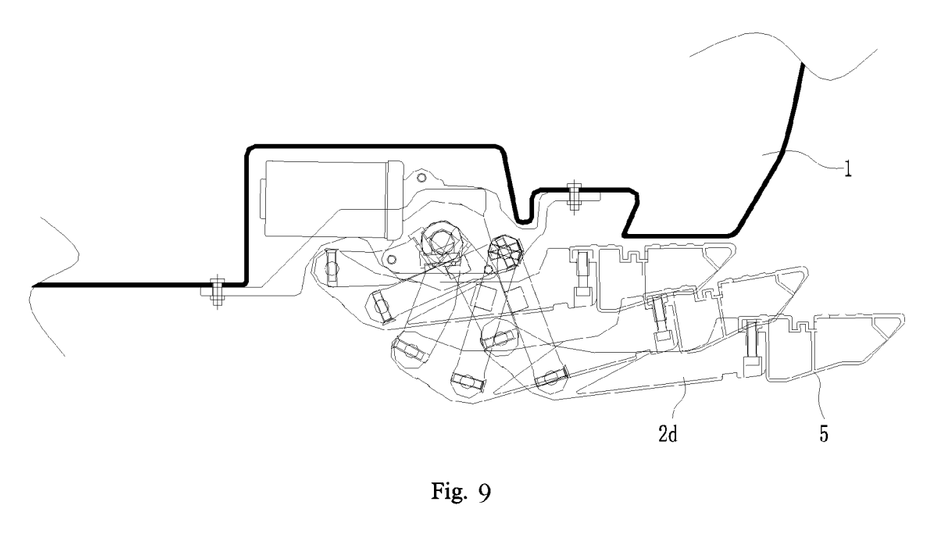

The rib 32 structure is specially designed for a vehicle lifting service. Since the pedal 5 will block the original vehicle lifting part on the bottom of the vehicle body 1, a jack or a vehicle lifting plate 34 of a lifter can hold against only the first connecting rod 2d directly when the vehicle is lifted up by the jack or the lifter. Therefore, the ribs 32 can effectively prevent the front end of the jack or the vehicle lifting plate 34 of the lifter from sliding off the first connecting rod 2d.

A T-shaped groove 5a is formed on the pedal 5. A connecting block 33 having a T-shaped section is mounted within the T-shaped groove 5a. Grooves fitted with the connecting block 33 are formed at front ends of the first connecting rod 2d and the second connecting rod 3d. A third threaded hole 26 for locking the pedal 5 is formed on the connecting block 33.

The first connecting rod 2d and the pedal 5 are connected by the connecting block 33, so the stress between the pedal 5 and the first connecting rod 2d is transferred to the outer wall of the connecting block 33, not completely borne by the bolts.

When the pedal 5 is in a retracted position and a stretched position, its upper surface is flush with the ground.

Ideally, no matter whether the pedal 5 is in the retracted position or the stretched position, its upper surface should be flush with the ground. Specifically, the force applied to the first connecting rod 2d by the pedal 5 in the retracted position may be vertically downward, without any outward component force. This ensures that the driving support 2 can retract tightly.

When the pedal 5 is in a retracted position and a stretched position, its upper surface forms an acute angle relative to the ground.

The upper surface of the pedal 5 in the retracted position and the stretched position may form a small angle relative to the ground, without affecting the usage.

More specifically, when the pedal 5 is in the retracted position and the stretched position, the upper surface of the pedal 5 is inclined inward at an angle of 0 to 5 degrees.

In order to ensure the reliability of the pedal 5, the upper surface of the pedal 5 is preferably inclined inward. With such an arrangement, when a user's shoe sole is slippery, the user will not slip due to the outward inclination of the upper surface of the pedal 5. In order to ensure the aesthetics of the pedal 5 in the stretched state, i.e., to ensure that the appearance of the whole vehicle will not be affected by a too large angle of inclination of the pedal 5, the upper surface of the pedal 5 should be inclined inward at a small angle, preferably at an angle of 0 to 5 degrees in this embodiment.

In another embodiment of the present invention, a retractable pedal 5 for automobiles is provided. The retractable pedal has a special support structure design, wherein a driving support 2 is directly connected to a driving shaft 4c of a driving mechanism 4. That is, the output shaft of the motor serves as the driving shaft 4c, and the gear transmission mechanism is omitted. This overcomes the defect that it is likely to generate abnormal sound in the conventional design where a pedal 5 is driven to stretch and retract by a gear transmission mechanism. Since the complicated gear transmission mechanism is omitted, the manufacture cost for the whole pedal 5 for automobiles is reduced greatly. Since a driving motor 4a of the driving mechanism 4 is equipped with a gearbox 4b and has a good self-locking function. This design, together with a special support structure, ensures that the pedal is always horizontal or approximately horizontal during the stretching and retraction process. Particularly, in a retracted position, when the pedal is in horizontal, a force onto the support structure applied by the weight of the pedal will not generate a horizontally outward component force. That is, there is no situation where the conventional retractable pedal 5 cannot be retracted tightly due to the horizontally outward component force. Accordingly, the pedal 5 is prevented from stretching during the running of a vehicle due to the non-tight retraction of the pedal to influence the passage of a vehicle body through a road and get into danger.

The fixed connection between the driving shaft 4c and a first driving arm 2b is firm. Specifically, by fitting a driving shaft locking device with a flat groove 4c1 formed on the driving shaft 4c and locking by a second locking bolt 23, a slope on a wedge-shaped fixation block 29 compresses the flat groove 4c1 on the driving shaft 4c, so that the firmness of the connection between the driving shaft 4c and the first driving arm 2b is ensured, and the relative sliding between the driving shaft 4c and the first driving arm 2b due to the loose connection after the long-term operation is avoided effectively. All transmission shafts are fixed to the corresponding support arms or driving arms by first locking bolts 22 to form a whole, so it is firmer than the simple close fitting of the transmission shafts within the shaft holes on the corresponding support arms or driving arms. Bushings 30 made of special material are provided between all the transmission shafts and the shaft holes and between the driving shaft 4c and the shaft holes, and the bushings 30 have a good self-lubrication effect, so the abnormal sound resulted from poor lubrication effect after long-term use is avoided. A first connecting rod 2d and a second connecting rod 3d are connected to the pedal 5 by a connecting block 33, so the stress between the pedal 5 and the first connecting rod 2d and the stress between the pedal 5 and the second connecting rod 3d are transferred to an outer wall of the connecting block 33, not completely borne by the bolts. Moreover, after the connecting block 33 is used to assist in connection, it can be detected whether the driving support 2 and the driven support 3 are mounted in correct positions. For example, after the first connecting rod 2d on the driving support 2 is connected to the pedal 5, if the groove on the second connecting rod 3d cannot be exactly fitted with the connecting block 33 at the corresponding position, it is indicated that the driven support 3 and the driving support 2 are offset in position; and vice versa. A rib 32 structure is provided on the bottom of the first connecting rod 2d and on the bottom of the second connecting rod 3d, so that the normal maintenance of a vehicle equipped with the retractable pedal 5 for automobiles of the present invention will not be influenced because the first connecting rod 2d and the second connecting rod 3d serve as the original vehicle lifting part on the bottom of the vehicle body 1.

With reference to FIGS. 1, 2, 3, 4 and 9, the electric pedal 5 for automobiles includes a driving support 2, a driving mechanism 4 and a pedal 5, the driving support 2 and the driving mechanism 4 being mounted on a same side of the bottom of a vehicle body 1, characterized in that the driving support 2 includes a first transmission mechanism and a first connecting rod 2d, with a front end of the first connecting rod 2d being fixedly connected to the pedal 5; and the first transmission mechanism drives the first connecting rod 2d to stretch and retract.

A driving shaft 4c of the driving mechanism 4 is fixedly connected to the first transmission mechanism directly and drives the first transmission mechanism to unfold and fold so as to allow the first connecting rod 2d to stretch and retract.

When the first connecting rod 2d transitions from a retracted state to a stretched state, the pedal 5 is driven to move to the underneath of an outer side of the vehicle body 1, wherein, when the pedal 5 is in a retracted state and a stretched state, its upper surface is substantially parallel to the ground.

The electric pedal further includes at least one driven support 3. The driven support 3 includes a second transmission mechanism and a second connecting rod 3d. A front end of the second connecting rod 3d is fixedly connected to the pedal 5. The driving support 2 drives the second transmission mechanism to synchronously unfold and fold by the pedal 5 so that the second connecting rod 3d synchronously stretches and retracts.

Figure 4:
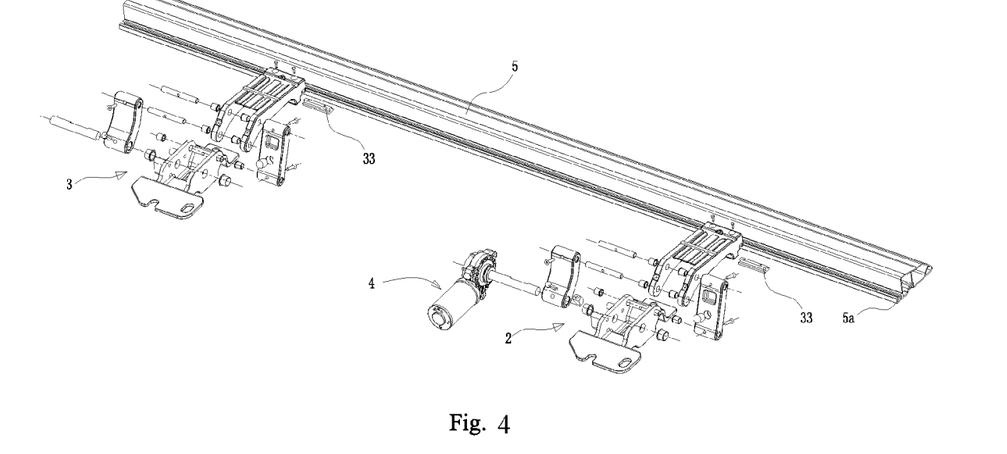
FIG. 4 is a stereoscopic breakdown structure diagram according to another embodiment of the present invention.

It is to be noted that FIG. 4 is a breakdown diagram viewed from the bottom. In the present invention, with a special support structure design, i.e., a driving support 2 and a driven support 3, the driving support 2 is connected to the driving mechanism 4, and the driving mechanism 4 drives the driving support 2 to fold or unfold so that the driven support 3 is driven to synchronously act relative to the driving support 2 by the pedal 5. In the state shown in FIG. 1, by taking the driving support 2 as example, the first driving arm 2b is fitted with the first support arc 2c. In this case, the pedal mounted at the front end of the first connecting rod 2d is horizontal or forms a very small included angle relative to the horizontal direction, and the first connecting rod 2d is stressed by its weight and a vertically downward force applied by the pedal 5, where the stressed forces are in a vertical direction. After the driving support 2 retracts in place, the driven support 3 also retracts in place due to the traction of the pedal. Due to the self-locking force of a gearbox 4b, there is no outward pull force or there is a too small pull force to resist against the self-locking force of the gearbox 4b, so there is no risk for the driving support 2 and the driven support 3 to stretch fully or stretch to a certain extent. The fit clearance between the pedal 5 and the vehicle body 1 is substantially consistent.

It is to be noted that the number of the driven support 3 is determined according to the length of the pedal 5 in an actual vehicle. Generally, when the pedal 5 is long, a double-support structure consisting of one driving support 2 and one driven support 3 is used; or, it is also possible to use a multi-support structure consisting of one driving support 2 and multiple driven supports 3.

Figure 1:
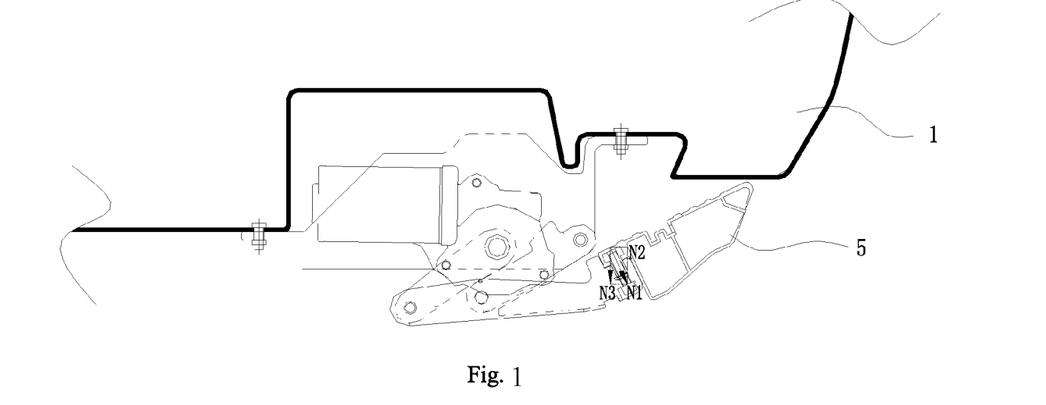
FIG. 1 is a schematic diagram of a pedal mounted on the bottom of a vehicle body in the prior art, when in the stretched state.
Figure 2:
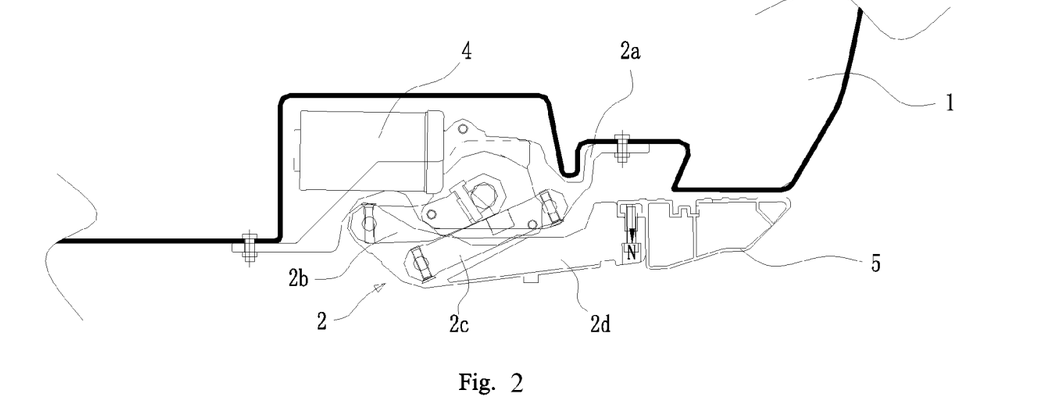
FIG. 2 is a schematic diagram of a driving support according to the present invention, when in the retracted state.
Figure 3:
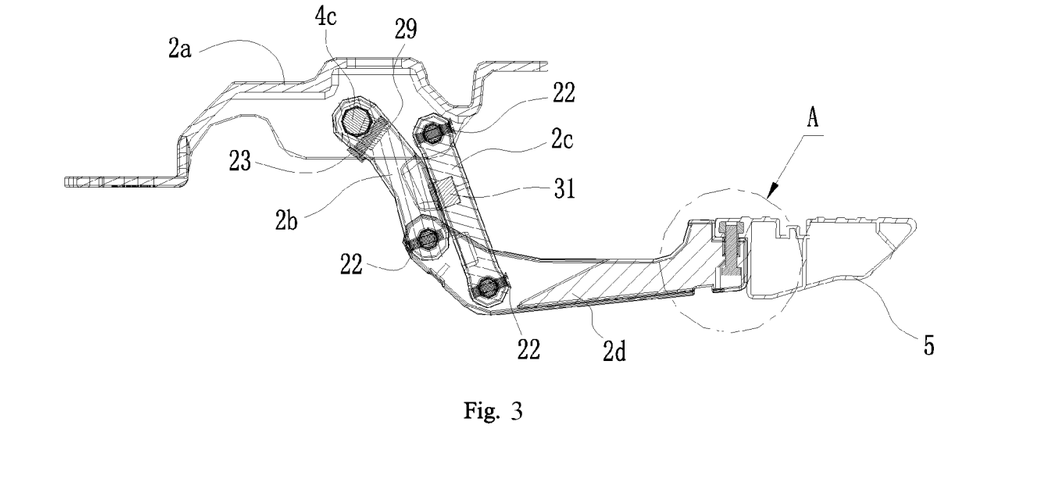
FIG. 3 is a schematic diagram of the driving support according to the present invention, when in the stretched state.

As shown in FIG. 3, after the pedal 5 retracts, an included angle between the pedal 5 and the horizontal direction is relatively large. By taking the driving support 2 as example, in this case, the stress on the first connecting rod 2 is as shown in this figure. That is, the pedal 5 applies an obliquely downward force N1 to the first connecting rod 2d. By force analysis, there is a horizontal component force N2 toward the outside of the vehicle body 1. This component force allows the first connecting rod 2d to have a trend of moving in a horizontally outward direction. The driving support 2 can retract in place due to the self-locking force of the gearbox 4b. However, since the driven support 3 has no self-locking force, a greater distance from the driven support 3 to the driving support 2 results in a longer arm of force, the moment of force is very likely to exceed the moment of the self-locking force of the gearbox 4, and the driven support 3 is less affected by the self-locking force of the driving support 2. In this case, the driven support 3 may be unable to retract in place. That is, there is a risk for the driven support 3 to stretch fully or stretch to a certain extent. In this case, the overall appearance of the vehicle body 1 will be influenced, and abnormal sound will occur during the running process; or even, since the pedal 5 fails to retract in place, the passage of the vehicle body through a road will be influenced, resulting in accidents.

With reference to FIGS. 5 and 6, the driving mechanism 4 includes a driving motor 4a mounted on the bottom of the vehicle body 1, a gearbox 4b is mounted at an output end of the driving motor 4a, and a driving shaft 4c of the gearbox 4b is connected to the first transmission mechanism.

By directly connecting the driving shaft 4c of the gearbox 4b to the first transmission mechanism, the complicated gear transmission mechanism is omitted and the manufacture cost is reduced.

The first transmission mechanism includes a first connecting pedestal 2a, a first driving arm 2b and a first support arm 2c. The driving shaft 4c runs through the first connecting pedestal to be fixedly connected to one end of the first driving arm 2b. The other end of the first driving arm 2b is rotatably connected to the first connecting rod 2d. Two ends of the first support arm 2c are rotatably connected to the first connecting pedestal 2a and the first connecting rod 2d, respectively. The second transmission mechanism includes a second connecting pedestal 3a, a second driving arm 3b and a second support arm 3c. Two ends of the second driving arm 3b are rotatably connected to the second connecting pedestal 3a and the second connecting rod 3d, respectively. Two ends of the second support arm 3c are rotatably connected to the second connecting pedestal 3a and the second connecting rod 3d, respectively.

A first connecting lug 6 and a second connecting lug 7 arranged in parallel are provided on each of the first connecting rod 2d and the second connecting rod 3d. First shaft holes 10 on a same axis and second shaft holes 11 on a same axis are formed on the first connecting lug 6 and the second connecting lug 7, respectively, and the axis of the first shaft holes 10 is parallel to the axis of the second shaft holes 11. A first connecting plate 8 and a second connecting plate 9 arranged in parallel are provided on each of the first connecting pedestal 2a and the second connecting pedestal 3a. Third shaft holes 12 on a same axis and fourth shaft holes 13 on a same axis are formed on the first connecting plate 8 and the second connecting plate 9, respectively, and the axis of the third shaft holes 12 is parallel to the axis of the fourth shaft holes 13. A first transmission shaft 18 is fixed at one end of each of the first support arm 2c and the second support arm 3c, and a second transmission shaft 19 is fixed at the other end thereof. Two ends of the first transmission shaft 18 on the first support arm 2c are fitted with the two first shaft holes 10 on the first connecting rods 2d, two ends of the second transmission shaft 19 on the first support arm 2c are fitted with the two third shaft holes 12 on the first connecting pedestal, two ends of the first transmission shaft 18 on the second support arm 3c are fitted with the two first shaft holes 10 on the second connecting rod 3d, and two ends of the second transmission shaft 19 on the second support arm 3c are fitted with the two third shaft holes 12 on the second connecting pedestal. A third transmission shaft 20 is fixed at one end of each of the first driving arm 2b and the second driving arm 3b. Two ends of the third transmission shaft 20 on the first driving arm 2b are fitted with the two second shaft holes 11 on the first connecting rod 2d, and two ends of the third transmission shaft 20 on the second driving arm 3b are fitted with the two second shaft holes 11 on the second connecting rod 3d. The driving shaft 4c is fixedly connected to the other end of the first driving arm 2b, and the driving shaft 4c is fitted with the two fourth shaft holes 13 on the first connecting pedestal 2a. A fourth transmission shaft 21 is fixed at the other end of the second driving arm 3b, and two ends of the fourth transmission shaft 21 are fitted with the two fourth shaft holes 13 on the second connecting pedestal 3a.

The first connecting pedestal 2a, the first connecting rod 2d, the first driving arm 2b and the first support arm 2c form a stable four-rod mechanism. The stable stretching and retraction of the first connecting rod 2d can be realized under the drive of the driving mechanism 4. In this way, the attitude of the pedal 5 in the retracted state and the stretched state is ensured. That is, this ensures that the upper surface of the pedal 5 is substantially parallel to the ground, and thus ensures that the force applied to the first connecting rod 2d by the pedal 5 in the retracted or stretched state is vertically downward or substantially vertically downward. Particularly, this prevents the generation of a horizontally outward component force which may cause the driving support 2 not to retract in place in the retracted state. Similarly, the second connecting pedestal 3a, the second connecting rod 3d, the second driving arm 3b and the second support arm 3c form a stable four-rod mechanism. Since the pedal in a retracted or stretched state will not apply a horizontally outward component force to the second connecting rod 3d, the self-locking force of the gearbox 4b on the driving support 2 is enough to ensure that the driven support 3 can retract in place.

Fifth shaft holes 14 for mounting the first transmission shaft 18 or the second transmission shaft 19 are formed at two ends of each of the first support arm 2c and the second support arm 3c, a sixth shaft hole 15 for mounting the third transmission shaft 20 is formed at one end of each of the first driving arm 2b and the second driving arm 3b, a seventh shaft hole 16 for mounting the driving shaft 4c is formed at the other end of the first driving arm 2b, and an eighth shaft hole 17 for mounting the fourth transmission shaft 21 is formed at the other end of the second driving arm 3b.

For ease of mounting, in the present invention, the transmission shafts on the first driving arm 2b, the second driving arm 3b, the first support arm 2c and the second support arm 3c are mounted detachably, so it is convenient to mount the retractable pedal 5 for automobiles of the present invention on the bottom of a different vehicle body 1 and adjust its position.

Transmission shaft locking devices are provided at two ends of each of the first support arm 2c, the second support arm 3c and the second driving arm 3b; and, a transmission shaft locking device is provided at one end of the first driving arm 2b and a driving shaft locking device is provided at the other end thereof.

It is to be noted that, since the driving shaft 4c and the transmission shafts are connected to the corresponding driving arms or support arms in a detachable manner, the mounting firmness of the driving shaft 4c and the transmission shafts will directly affect the stability of the actions of the driving support 2 and the driven support 3, and infirm mounting will cause abnormal sound. Therefore, in the present invention, transmission shaft locking devices are provided for all the transmission shafts, and a driving shaft 4c locking device is provided for the driving shaft 4c.

The transmission shaft locking devices include first locking bolts 22. First threaded holes 24 fitted with the first locking bolts 22 are formed in middle sections of all the first transmission shaft 18, the second transmission shaft 19, the third transmission shaft 20 and the fourth transmission shaft 21. First through holes 27 for allowing the first locking bolts 22 to pass therethrough are formed at two ends of the first support arm 2c, at two ends of the second support arm 3c, at two ends of the second driving arm 3b and at one end of the first driving arm 2b.

The first locking bolts 22 may connect the corresponding transmission shafts to the corresponding driving arms or support arms to form a whole, so the relative sliding, particularly relative rotation, between the transmission shafts and the driving arms or support arms is avoided.

The driving shaft locking device includes a second locking bolt 23 and a wedge-shaped fixation block 29. A flat groove 4c1 is formed in a middle section of the driving shaft 4c. A conical hole and a second through hole 28 which are perpendicular to the seventh shaft hole 16 and located on a same axis are formed at an end of the first driving arm 2b connected to the driving shaft 4c. The wedge-shaped fixation block 29 is inserted into the conical hole from one side of the first driving arm 2b. A slope fitted with the flat groove 4c1 on the driving shaft 4c is provided on a sidewall of the wedge-shaped fixation block. A second threaded hole 25 coaxial to the wedge-shaped fixation block is formed on the wedge-shaped fixation block 29. The second locking bolt 23 is inserted into the second through hole 28 from the other side of the first driving arm 2b and in thread fit with the second threaded hole 25.

Since the torque borne by the driving shaft 4c after being fixedly connected to the first driving arm 2b is much greater than that borne by other transmission shafts, the driving shaft 4c locking device has a firmer locking function than the transmission shaft locking devices. The wedge-shaped fixation block 29 and the second locking bolt 23 are mounted on two sides of the first driving arm 2b, respectively, so the slope on the wedge-shaped fixation block 29 can compress the flat groove 4c1 on the driving shaft 4c more tightly by locking the second locking bolt 23, and the fixation of the driving shaft 4c and the first driving arm 2b becomes firmer.

Bushings 30 are provided within all the first shaft holes 10, the second shaft holes 11, the third shaft holes 12 and the fourth shaft holes 13.

When the driving shaft 4c and the transmission shafts are fitted with the corresponding shaft holes, a lubricating medium is generally needed for the lubrication between the shafts and the holes. Since the wall of holes and the shafts are made of metal, in the case of no continuous supply of the lubrication medium, the shafts and the shaft holes will be worn out due to long-term friction and will generate abnormal sound. It is inevitable to carry out special wear-resistant treatment to improve the wear resistance of the shafts and the shaft holes. In doing so, the manufacture process will become more complicated, and the manufacture cost will also be increased relatively. Therefore, in the present invention, bushings 30 made of special material with a self-lubricating function are mounted within all the shaft holes. Since the bushings 30 are relatively small in size, the bushings 30 may be made of different material from other components, so that it is easy to manufacture the bushings and the cost is greatly reduced.

Sunk grooves are formed on a side of the first support arm 2c and a side of the second support arm 3c both facing the first driving arm 2b and the second driving arm 3b, and cushions 31 are mounted within the sunk grooves.

It is to be noted that, when the pedal 5 stays in the retraced position or the stretched position, both the driving support 2 and the driven support 3 should have good stability; and, when the pedal 5 reaches the retraced position or the stretched position, the collision and shock between components should be reduced as far as possible. The cushions 31 are mounted on an inner side of the first support art 2c and an inner side of the second support arm 3c, specifically on a side facing the first driving arm 2b and the second driving arm 3b. By taking the driving support 2 as example, when the pedal 5 is in a completely stretched position, the first driving arm 2b compresses the cushions 31. In this case, the first driving arm 2b, the cushions 31 and the first support arm 2c are closely fitted with each other, so that the driving support 2 is in an unfolded state. The cushions 31 ensure the close fitting of the first driving arm 2b with the first support arm 2c and also reduce the collision between the first support arm 2c and the first driving arm 2b. When the pedal 5 is retracted, the cushions 31 on the first support arm 2c is also compressed by the first driving arm 2b, and the cushions 31, the first support arm 2c and the first driving arm 2b are closely fitted with each other, so that the driving support 2 is in another state.

Ribs 32 are provided on bottoms of a side of the first connecting rod 2d and a side of the second connecting rod 3d both close to the pedal 5.

The rib 32 structure is specially designed for a vehicle lifting service. Since the pedal 5 will block the original vehicle lifting part on the bottom of the vehicle body 1, a jack or a vehicle lifting plate 34 of a lifter can hold against only the first connecting rod 2d and the second connecting rod 3d directly when the vehicle is lifted up by the jack or the lifter. Therefore, the ribs 32 can effectively prevent the front end of the jack or the vehicle lifting plate 34 of the lifter from sliding off the first connecting rod 2d or the second connecting rod 3d.

A T-shaped groove 5a is formed on the pedal 5. A connecting block 33 having a T-shaped section is mounted within the T-shaped groove 5a. Grooves fitted with the connecting block 33 are formed at front ends of the first connecting rod 2d and the second connecting rod 3d. A third threaded hole 26 for locking the pedal 5 is formed on the connecting block 33.

The first connecting rod 2d and the second connecting rod 3d are connected to the pedal 5 by a connecting block 33, so the stress between the pedal 5 and the first connecting rod 2d and the stress between the pedal 5 and the second connecting rod 3d are transferred to an outer wall of the connecting block 33, not completely borne by the bolts. Moreover, after the connecting block 33 is used to assist in connection, it can be detected whether the driving support 2 and the driven support 3 are mounted in correct positions. For example, after the first connecting rod 2d on the driving support 2 is connected to the pedal 5, if the groove on the second connecting rod 3d cannot be exactly fitted with the connecting block 33 at the corresponding position, it is indicated that the driven support 3 and the driving support 2 are offset in position; and vice versa.

When the pedal 5 is in a retracted position and a stretched position, its upper surface is flush with the ground.

Ideally, no matter whether the pedal 5 is in the retracted position or the stretched position, its upper surface should be flush with the ground. Specifically, the force applied to the first connecting rod 2d and the second connecting rod 3d by the pedal 5 in the retracted position may be vertically downward, without any outward component force. This ensures that the driving support 2 can retract tightly.

When the pedal 5 is in a retracted position and a stretched position, its upper surface forms an acute angle relative to the ground.

The upper surface of the pedal 5 in the retracted position and the stretched position may form a small angle relative to the ground, without affecting the usage.

More specifically, when the pedal 5 is in the retracted position and the stretched position, the upper surface of the pedal 5 is inclined inward at an angle of 0 to 5 degrees.

In order to ensure the reliability of the pedal 5, the upper surface of the pedal 5 is preferably inclined inward. With such an arrangement, when a user's shoe sole is slippery, the user will not slip due to the outward inclination of the upper surface of the pedal 5. In order to ensure the aesthetics of the pedal 5 in the stretched state, i.e., to ensure that the appearance of the whole vehicle will not be affected by a too large angle of inclination of the pedal 5, the upper surface of the pedal 5 should be inclined inward at a small angle, preferably at an angle of 0 to 5 degrees in this embodiment.

Although the present invention has been described by exemplary implementations, it should be understood that the present invention is not limited to the detailed description and the illustrated specific implementations, and various improvements or transformations can be made to the exemplary implementations by those skilled in the art without departing from the scope defined by the appended claims.

What is claimed is:

1. An electric pedal for automobiles, comprising a driving support (2), a driving mechanism (4) and a pedal (5), the driving support (2) and the driving mechanism (4) being mounted on a same side of a bottom of a vehicle body (1), wherein, the driving mechanism (4) comprises a driving motor (4a) mounted on the bottom of the vehicle body (1), a gearbox (4b) is mounted at an output end of the driving motor (4a), wherein, the driving support (2) comprises a first transmission mechanism and a first connecting rod (2d), with a front end of the first connecting rod (2d) being fixedly connected to the pedal (5); the first transmission mechanism drives the first connecting rod (2d) to stretch and retract; a driving shaft (4c) of the gearbox (4b) is fixedly connected to the first transmission mechanism directly and drives the first transmission mechanism to unfold and fold so as to allow the first connecting rod (2d) to stretch and retract; and, when the first connecting rod (2d) transitions from a retracted state to a stretched state, the pedal (5) is driven to move to an underneath of an outer side of the vehicle body (1), wherein, when the pedal (5) is in a retracted state and a stretched state, an upper surface of the pedal (5) is substantially parallel to the ground, wherein, the first transmission mechanism comprises a first connecting pedestal (2a), a first driving arm (2b) and a first support arm (2c); the driving shaft (4c) runs through the first connecting pedestal to be fixedly connected to one end of the first driving arm (2b); the other end of the first driving arm (2b) is rotatably connected to the first connecting rod (2d); and, two ends of the first support arm (2c) are rotatably connected to the first connecting pedestal (2a) and the first connecting rod (2d), respectively, and, wherein, a first connecting lug (6) and a second connecting lug (7) arranged in parallel are provided on the first connecting rod (2d), with first shaft holes (10) on a same axis and second shaft holes (11) on a same axis being formed on the first connecting lug (6) and the second connecting lug (7), respectively, and the axis of the first shaft holes (10) being parallel to the axis of the second shaft holes (11); a first connecting plate (8) and a second connecting plate (9) arranged in parallel are provided on the first connecting pedestal (2a), with third shaft holes (12) on a same axis and fourth shaft holes (13) on a same axis being formed on the first connecting plate (8) and the second connecting plate (9), respectively, and the axis of the third shaft holes (12) being parallel to the axis of the fourth shaft holes (13); a first transmission shaft (18) is fixed at one end of the first support arm (2c) and a second transmission shaft (19) is fixed at the other end thereof, with two ends of the first transmission shaft (18) on the first support arm (2c) being fitted with the two first shaft holes (10) on the first connecting rods (2d), and two ends of the second transmission shaft (19) on the first support arm (2c) being fitted with the two third shaft holes (12) on the first connecting pedestal; a third transmission shaft (20) being fixed at one end of the first driving arm (2b), with two ends of the third transmission shaft (20) on the first driving arm (2b) being fitted with the two second shaft holes (11) on the first connecting rod (2d); and, the driving shaft (4c) is fixedly connected to the other end of the first driving arm (2b), and the driving shaft (4c) is fitted with the two fourth shaft holes (13) on the first connecting pedestal (2a).

2. The electric pedal for automobiles according to claim 1, wherein, fifth shaft holes (14) for mounting the first transmission shaft (18) or the second transmission shaft (19) are formed at two ends of the first support arm (2c); and, a sixth shaft hole (15) for mounting the third transmission shaft (20) is formed at one end of the first driving arm (2b) and a seventh shaft hole (16) for mounting the driving shaft (4c) is formed at the other end thereof.

3. The electric pedal for automobiles according to claim 2, wherein, transmission shaft locking devices are provided at two ends of the first support arm (2c); and, a transmission shaft locking device is provided at one end of the first driving arm (2b) and a driving shaft locking device is provided at the other end thereof.

4. The electric pedal for automobiles according to claim 3, wherein, the transmission shaft locking devices comprise first locking bolts (22), first threaded holes (24) fitted with the first locking bolts (22) are formed in middle sections of all the first transmission shaft (18), the second transmission shaft (19) and the third transmission shaft (20), and first through holes (27) for allowing the first locking bolts (22) to pass therethrough are formed at two ends of the first support arm (2c) and at one end of the first driving arm (2b).

5. The electric pedal for automobiles according to claim 3, wherein, the driving shaft locking device comprises a second locking bolt (23) and a wedge-shaped fixation block (29); a flat groove (4c1) is formed in a middle section of the driving shaft (4c); a conical hole and a second through hole (28) which are perpendicular to the seventh shaft hole (16) and located on a same axis are formed at an end of the first driving arm (2b) connected to the driving shaft (4c); the wedge-shaped fixation block (29) is inserted into the conical hole from one side of the first driving arm (2b); a slope fitted with the flat groove (4c1) on the driving shaft (4c) is provided on a sidewall of the wedge-shaped fixation block (29); a second threaded hole (25) coaxial to the wedge-shaped fixation block (29) is formed on the wedge-shaped fixation block (29); and, the second locking bolt (23) is inserted into the second through hole (28) from the other side of the first driving arm (2b) and in thread fit with the second threaded hole (25).

6. The electric pedal for automobiles according to claim 1, wherein, bushings (30) are provided within all the first shaft holes (10), the second shaft holes (11), the third shaft holes (12) and the fourth shaft holes (13).

7. The electric pedal for automobiles according to claim 1, wherein, sunk grooves are formed on a side of the first support arm (2c) and a side of a second support arm (3c) both facing the first driving arm (2b) and a second driving arm (3b), and cushions (31) are mounted within the sunk grooves.

8. The electric pedal for automobiles according to claim 1, wherein, ribs (32) are provided on bottoms of a side of the first connecting rod (2d) and a side of a second connecting rod (3d) both close to the pedal (5).

9. The electric pedal for automobiles according to claim 1, characterized in that wherein, a T-shaped groove (5a) is formed on the pedal (5), a connecting block (33) having a T-shaped section is mounted within the T-shaped groove (5a), grooves fitted with the connecting block (33) are formed at front ends of the first connecting rod (2d) and a second connecting rod (3d), and a third threaded hole (26) for locking the pedal (5) is formed on the connecting block (33).

10. The electric pedal for automobiles according to claim 1, wherein, when the pedal (5) is in a retracted position and a stretched position, its upper surface is flush with the ground.

11. The electric pedal for automobiles according to claim 1, wherein, when the pedal (5) is in a retracted position and a stretched position, its upper surface forms an acute angle relative to the ground.

12. The electric pedal for automobiles according to claim 11, wherein, the upper surface of the pedal (5) is inclined inward at an angle of 0 to 5 degrees.

\* \* \* \* \*